Jan. 27, 1953    W. R. SPILLER    2,626,667
HOLLOW DRILL ASSEMBLY
Filed June 14, 1947
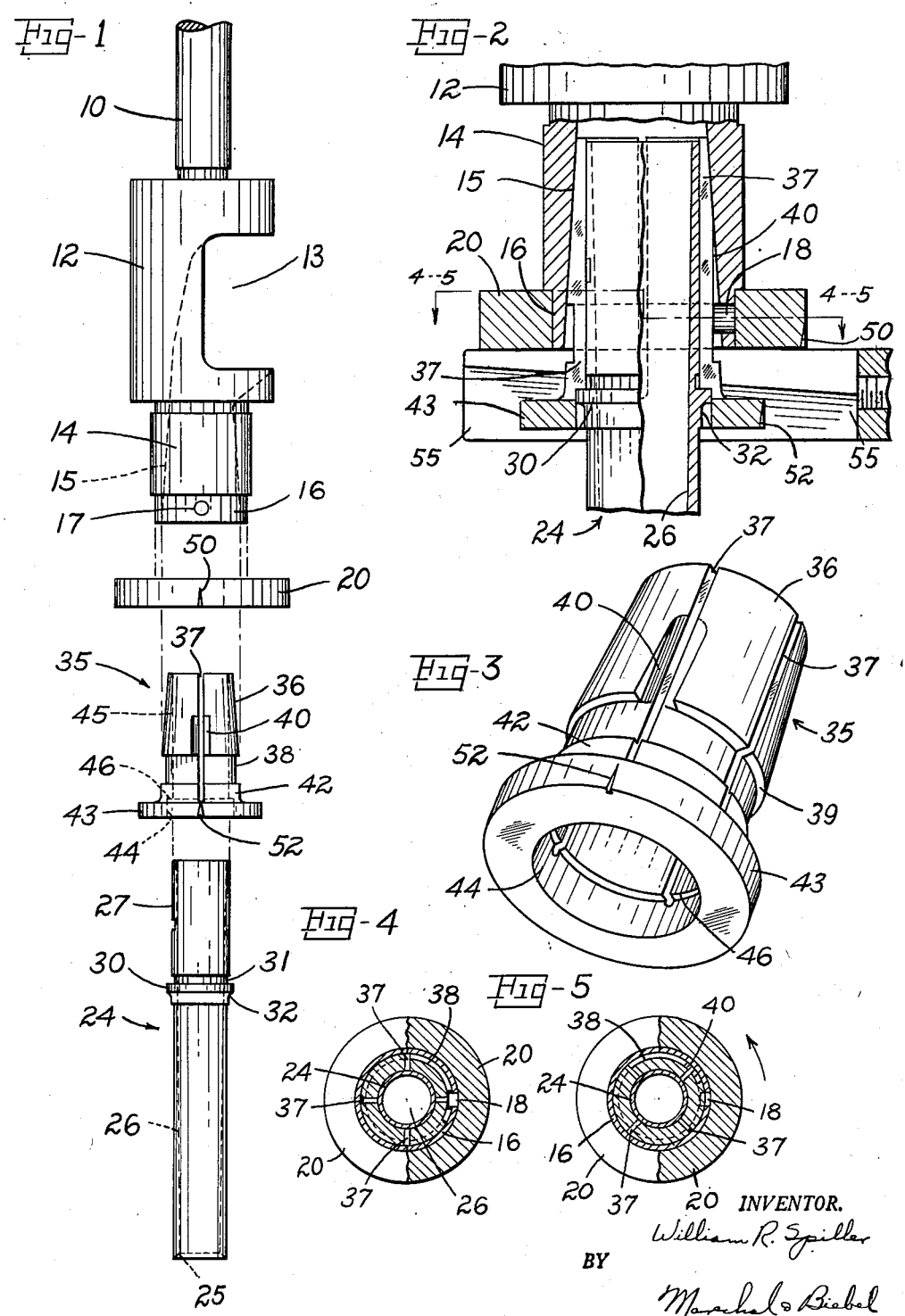
INVENTOR.
William R. Spiller
BY
Marshal & Biebel
ATTORNEYS Patented Jan. 27, 1953

2,626,667

UNITED STATES PATENT OFFICE 2,626,667

HOLLOW DRILL ASSEMBLY

William R. Spiller, Dayton, Ohio, assignor to Harris-Seybold Company, Cleveland, Ohio, a corporation of Delaware Application June 14, 1947, Serial No. 754,733

4 Claims. (Cl. 164—86)

1

This invention relates to drills and more particularly to hollow drill assemblies.

It is the principal object of the invention to provide a hollow drill assembly which receives and retains the hollow drill firmly in operative position, which transfers the thrust from the drill into the drill head spindle, and in which removal and replacement of the drill is simply and readily performed.

It is another object to provide a drill having a shoulder at an intermediate point through which the thrust load is transmitted and which can be made of adequate surface area to assure proper bearing while avoiding objectionable wear and without weakening or reducing the section of the drill body itself.

It is a further object to provide such a drill assembly having a seat for receiving a collet which is readily replaceable, in which the drill is removably received, and which transfers the thrust of the drill into the drill head spindle.

It is also an object to provide a drill assembly with a split and tapered collet which is received within a tapered seat in the drill head spindle, the split portions of the collet engaging and gripping the upper end of the drill, an outwardly extending shoulder at an intermediate point on the drill seating within a recess on the collet to transmit the thrust load thereto from such intermediate position thus providing for firm and accurate holding of the drill during operation.

It is a still further object to provide such a drill assembly including a collet which is arranged to be withdrawn from the seat in the drill head spindle to a position releasing the drill while still retaining the collet in assembled relation on the drill head spindle and from which it may be removed when desired by indexing to a predetermined position.

Other objects and advantages will be apparent from the following description, the accompanying drawings and the appended claims.

In the drawings:

Fig. 1 is an exploded view with the parts shown in elevation of a drill assembly in accordance with the present invention;

Fig. 2 is a view of the parts in assembled relation, part of the view being shown in section and part in elevation;

Fig. 3 is a perspective view on an enlarged scale of the collet; and

Figs. 4 and 5 are horizontal sectional views on the broken line 4—4, 5—5 of Fig. 2 showing the collet in released and locked positions, respectively.

2

The present invention relates to hollow drills of the type used for forming holes in paper, leather, and other materials where the holes are either to be used as such, or in conjunction with additional slotting or slitting operations. The drill for such use comprises a hollow body having an inwardly beveled bottom cutting edge and an upper shank portion which is adapted to be gripped in suitable holding means carried by the drill head spindle in such manner that the drill is firmly secured and maintained in place when in operative position but is adapted to be quickly and easily removed when desired, the operation of removing and replacing the drill in proper and accurate operative position being simply and easily performed. The holding member receiving the drill is relatively inexpensive and is readily replaceable in the event that wear should occur. Further it may be merely loosened to free the drill while remaining attached to the drill head spindle, or by a simple indexing operation may be separated from the drill head spindle for removal therefrom.

Further, the drill is provided with a shoulder located intermediate its lower cutting edge and its upper shank portion, the shoulder being of sufficiently larger diameter than the body of the drill to provide adequate area for transmission of the thrust load, this being accomplished without weakening or reducing the cross sectional area of the drill itself since the limitations imposed on the body of a hollow drill are quite definite and ordinarily do not afford extra material for this purpose. The thrust load may be quite substantial, and by providing such enlarged intermediate shoulder capable of carrying the thrust load without excessive wear or deformation of its bearing surface, the thrust load is removed from the upper end of the drill and the difficulty of transmitting the load through the necessarily limited cross section of the drill body or shank available at the upper end of the drill, is avoided. Further, the load is transferred from the drill at an intermediate point below the upper end and closer to the working zone which additionally provides for improved stability and uniformity in operating characteristics.

Referring to the drawings which disclose a preferred embodiment of the invention, the drill spindle is indicated at 10 as comprising a rod or bar of solid cylindrical section. This spindle is adapted to be received in a suitable drill head for supporting and driving the same, a suitable construction for this purpose being the drill heads shown in applicant's copending application Serial No. 718,380, filed December 26, 1946. Below the cylindrical part 10 an enlargement 12 is formed which is milled to provide an opening 13 at one side through which the chips produced by the drill are discharged when operating. The lower portion 14 of the spindle is hollow and the inner diameter is bored to provide a taper 15 decreasing upwardly as shown forming a socket. At the lower end of portion 14 there is a neck 16 of somewhat reduced diameter and this neck is drilled as shown at 17 to receive a pin 18 which is secured therein with a press fit. A flange 20 of proper internal diameter is pressed over the neck 16 to provide additional stiffening for the lower end of the socket member thus provided.

The hollow drill is shown generally at 24, having a lower beveled cutting edge 25 and a hollow tapered bore indicated at 26 of substantial diameter relative to the outside diameter of the drill, in order to provide a passage through which the chips cut out by the drill may be discharged. The drill has a cylindrical shank portion 27 at its upper end, and below the shank and at an intermediate location on the body of the drill, a shoulder 30 is provided which extends outwardly beyond the outer circumference to the main drill body. The shank is preferably undercut immediately above the shoulder as shown at 31 to provide relief when grinding shank portion 27, and below the shoulder the diameter decreases over a radius as shown at 32.

The shoulder 30 extends outwardly beyond the diameter of the main drill body sufficiently to provide adequate bearing area for transmitting the thrust and shock load of the drill. For example with a drill adapted to cut holes of half inch diameter, the outside diameter of the drill shank may be approximately 0.499 inch with the hollow passage at the top of the shank having a diameter of 0.440 inch. The shoulder 30 in this case may have a diameter of 0.5625 inch, thus affording a bearing area approximately 22% greater than that available at the upper end of the drill. Also as will be clearly understood, the diameter of the shoulder 30 is not necessarily limited but may be increased beyond that indicated if additional bearing area is desired.

Holding means for the drill is provided in the form of a collet indicated generally at 35. The collet has an upper tapered portion 36 which is split by means of a series of cuts 37 providing flexibility and a plurality of flexible tongues, the taper of the surface of such tongues being such as to fit within and correspond to that of socket 15. Beneath the tapered portion 36 is a short annular portion 38 which is of lesser diameter than the adjacent part of the tapered surface forming an overhanging edge or shoulder 39 and of an axial length somewhat greater than that of pin 18.

A narrow, axially extending slot or flat 40 is formed at one side of the tapered surface 36 of a width sufficient to receive pin 18 freely therein, the flat preferably overlying one of the slots 37, running into the annular area 38, and extending axially in the same plane as that area. The flat is shown in Fig. 3 as running out about half way up on the tapered tongues 36, the flat being a flat bottom key slot of substantially the same radius outwardly from the axis of the collet as that of the neck portion 38.

Beneath the neck portion 38 the collet is formed with a part 42 of somewhat larger diameter which flares into a bottom flange member 43. The collet is bored with two different diameters, a larger diameter 44 at the bottom part providing for receiving the shoulder 30 of the drill and a smaller diameter 45 at its upper part, leaving an offset and recessed seat 46 against which the thrust face of collar 30 is adapted to bear to transmit the thrust load. Preferably an index mark 50 is provided on the outer circumference of flange 20 opposite pin 18, and a cooperating index mark 52 is provided on flange 43 opposite the flat 40 of the collet.

The parts are assembled as follows. The drill 24 is first fitted into the collet with the split tapered tongues 36 of the collet engaged over the shank portion 27 of the drill and with the drill shoulder 30 fitting into recessed seat 46. This assembly is then inserted into the tapered socket 15 of the drill head spindle, and pressed into position therein. In assembling the collet and drill in place it is important to so orient the collet relative to the pin 18 that the flat 40 will be in alignment with the pin so that when inserted into position the pin will travel freely through the flat or slot and allow the collet to reach its final seating position. After the collet has been moved substantially into its final position but before it is wedged into its tapered seat, the pin 18 has cleared the edge or shoulder 39, and the collet is then given a twisting motion so that the pin will travel beneath the edge 39 and into the area of the neck 38, the neck portion 38 having an axial length somewhat greater than the diameter of pin 18 to allow for movement thereof. Pressure may then be applied and such pressure, as well as the axial thrust load developed during working operation serves to contract the split tongues 36 of the collet into tightly gripping relation with the shank 27 of the drill and the load therefore itself tends to develop a firm holding force to maintain the drill in proper operative relation. During operation the thrust load on the drill is transmitted through the outwardly extending shoulder 30 at a point intermediate the shank of the main body of the drill, and thus closer to the working end of the drill, the load thus transferred to the collet, and through it and its tapered socket into the drill head spindle. Because of the substantial bearing area thus available excessive wear or deformation of the surface of the shoulder 30 is effectively avoided and a highly satisfactory operation is secured.

When it is desired to remove a drill, the collet may be withdrawn from its tapered seat, through the use of a suitable forked prying or wedging tool 55 working between the flanges 20 and 43, if necessary. The collet will then drop outwardly to the extent permitted by the clearance between pin 18 and the neck 38, releasing the drill and allowing the same to be removed and replaced. Normally however the collet will not be removed but remains in assembled position ready to receive a new drill. This is the relationship illustrated in Fig. 5 where the collet is retained in position. However when it is desired to remove the collet entirely, it is only necessary that it be indexed to the position where flat 40 overlies pin 18, and as illustrated in Fig. 4, the entire collet can then be directly withdrawn and replaced.

The invention thus provides a hollow drill assembly which is simple and yet highly satisfactory in construction and appearance, providing the maximum of strength and wear resistance during operation while maintaining the full bodied and desired inherent strength of the drill itself.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A hollow drill assembly of the character described which comprises a drill head spindle having a tapered socket therein, a tapered split collet releasably received within said socket, said collet having a central bore and an offset seat of larger diameter than said bore, a hollow drill having a shank portion adapted to be received within said bore in clamping position therein and having an outstanding shoulder spaced from said shank of larger diameter than said shank portion and adapted to be received in said seat to transmit the thrust load to said collet causing the tightening of said collet in gripping relation against the shank of said drill, and means providing for retaining said collet in assembled relation upon said drill head spindle following withdrawal from said tapered socket therein to provide for release of said drill shank including a circumferentially arranged groove on said collet of lesser diameter than that of the adjacent tapered portion thereof forming a retaining member, and a pin on said spindle receivable in said groove and of smaller diameter than the width of said groove to retain said collet in position within said socket while providing for axial movement of said collet into and out of gripping relation with said socket.

2. A hollow drill assembly of the character described which comprises a drill head spindle having a tapered socket therein, a tapered split collet releasably received within said socket, said collet having a central bore and an offset seat of larger diameter than said bore, a hollow drill having a shank portion adapted to be received within said bore in clamping position therein and having an outstanding shoulder spaced from said shank of larger diameter than said shank portion and adapted to be received in said seat to transmit the thrust load to said collet causing the tightening of said collet in gripping relation against the shank of said drill, and means providing for retaining said collet in assembled relation upon said drill head spindle following withdrawal from said tapered socket therein to provide for release of said drill shank including a circumferentially arranged groove on said collet of lesser diameter than that of the adjacent tapered portion thereof forming a retaining member, and a pin on said spindle receivable in said groove and of smaller diameter than the width of said groove to retain said collet in position within said socket while providing for limited axial movement of said collet into and out of gripping relation with said socket, said groove having a slot connected therewith in one position for passage of said pin to provide for removal and replacement of said collet in said socket upon proper indexing relationship thereto.

3. A hollow drill assembly of the character described which comprises a drill head spindle having a tapered socket therein, a tapered split collet releasably received within said socket, said collet having a central bore and an offset seat of larger diameter than said bore adjacent the outer end of said bore, a hollow drill having a shank portion adapted to be received within said bore in clamping position therein and having an outstanding shoulder spaced below said shank and of larger diameter than said shank portion for engagement with said seat to transmit the thrust load to said collet causing the tightening of said collet in gripping relation against the shank of said drill, means for retaining said collet in assembled relation upon said drill head spindle following withdrawal from said tapered socket therein to provide for release of said drill shank, said retaining means including a projection and a complementary circumferentially arranged recess located one on said spindle and the other on said collet for interfitting engagement, said recess having axial dimensions greater than said projection to provide for axial movement of said collet into and out of gripping relation with said socket, and said recess being relieved axially at one portion thereof to provide for complete release of said collet from said drill head upon relative indexing thereof to a position of axial alignment of said projection with said relieved portion of said recess.

4. A hollow drill assembly of the character described for use with a hollow drill having a shank portion at the upper end thereof, comprising a drill head spindle having a tapered socket therein, a tapered split collet proportioned to be received within said socket, said collet having a central bore for receiving said shank portion of said drill, said collet having a tapered outer surface for frictional engagement within said tapered socket and resulting clamped engagement of said drill shank in said bore, said collet and said spindle having interfitting retaining means including a projection and a complementary circumferential recess located one on said spindle and the other on said collet for retaining said collet in assembled relation within said socket following withdrawal thereof from frictional engagement with said socket to provide for release of said drill shank, said recess having greater axial dimensions than said projection to provide for axial movement of said collet into and out of gripping engagement with said socket while retaining said projection and said recess in interfitting relation, and said recess being relieved axially at one portion thereof to provide for separation of said collet and said spindle upon relative indexing thereof to a position of axial alignment of said projection with said relieved portion of said recess.

WILLIAM R. SPILLER.

REFERENCES CITED

The following references are of record in the file of this patent:

UNITED STATES PATENTS

| Number | Name | Date |
| --- | --- | --- |
| 668,286 | Freese | Feb. 19, 1901 |
| 808,408 | Sparks | Dec. 26, 1905 |
| 1,044,299 | Trundle | Nov. 12, 1912 |
| 1,119,766 | Simmons | Dec. 1, 1914 |
| 1,278,428 | Bocorselski | Sept. 10, 1918 |
| 1,603,337 | Gury | Oct. 19, 1926 |
| 1,622,256 | Stevens | Mar. 22, 1927 |
| 1,841,635 | Salmon | Jan. 19, 1932 |
| 2,141,712 | Gylleck | Dec. 27, 1938 |
| 2,142,560 | Eickman | Jan. 3, 1939 |

FOREIGN PATENTS

| Number | Country | Date |
| --- | --- | --- |
| 884,026 | France | July 30, 1943 |